United States Patent [19]

Bras et al.

[11] Patent Number: 4,783,086
[45] Date of Patent: Nov. 8, 1988

[54] SEALING RING WITH TWO ROWS OF PROJECTIONS AND FOR A ROTARY SHAFT

[75] Inventors: Johan C. M. Bras, Tricht; Hendrik W. Wevers, Goes, both of Netherlands

[73] Assignee: SKF Industrial Trading & Development Co., B.V., Nieuwegein, Netherlands

[21] Appl. No.: 5,071

[22] Filed: Jan. 20, 1987

Related U.S. Application Data

[62] Division of Ser. No. 654,307, Sep. 25, 1984, Pat. No. 4,671,519.

[30] Foreign Application Priority Data

Oct. 5, 1983 [NL] Netherlands .................. 83/03411

[51] Int. Cl.$^4$ .................................................. F16J 15/32
[52] U.S. Cl. ........................................ 277/134; 277/153
[58] Field of Search ................. 277/134, 133, 152, 153

[56] References Cited

U.S. PATENT DOCUMENTS

| | | | |
|---|---|---|---|
| 3,586,342 | 6/1971 | Staab | 277/134 |
| 3,785,660 | 1/1974 | Bush | 277/134 |
| 3,790,180 | 2/1974 | Heyn et al. | 277/134 |
| 3,807,743 | 4/1974 | Burke | 277/134 |
| 3,868,105 | 2/1975 | Bentley | 277/134 |
| 3,895,814 | 7/1975 | Kupfert et al. | 277/134 |
| 3,921,987 | 11/1975 | Johnston et al. | 277/134 |
| 4,084,826 | 4/1978 | Vossieck et al. | 277/134 |
| 4,183,543 | 1/1980 | Antonini | 277/134 |
| 4,441,722 | 4/1984 | Pichler | 277/134 |

FOREIGN PATENT DOCUMENTS

| | | | |
|---|---|---|---|
| 1196451 | 6/1970 | United Kingdom | 277/134 |
| 1220985 | 1/1971 | United Kingdom | 277/134 |
| 1252911 | 11/1971 | United Kingdom | 277/134 |
| 1382281 | 1/1975 | United Kingdom | 277/134 |

Primary Examiner—Robert S. Ward
Attorney, Agent, or Firm—Rosen, Dainow & Jacobs

[57] ABSTRACT

An improved seal for a rotary shaft which exerts a pumping effect on a lubricant on its shaft. The seal comprises a substantially rigid annular supporting member and a generally annular elastic sealing member affixed coaxially to the supporting member and extending radially inwardly of the supporting member. The radially inner surface of the said sealing member defines a sealing contact surface adapted to sealingly contact the shaft. The improvement includes a first circumferentially extending portion on the sealing contact surface and a plurality of projecting portions extending axially from one side of the first portion and being circumferentially spaced apart, the first portion having a substantially constant axial width throughout its circumferences. The first portion also extends at an acute angle with respect to the axis of the rotary shaft, the projections having circumferentially extending edges spaced from the one side of the first portion and joined to second and third edges which extend to the one side of the first portion at acute angles thereto.

13 Claims, 2 Drawing Sheets

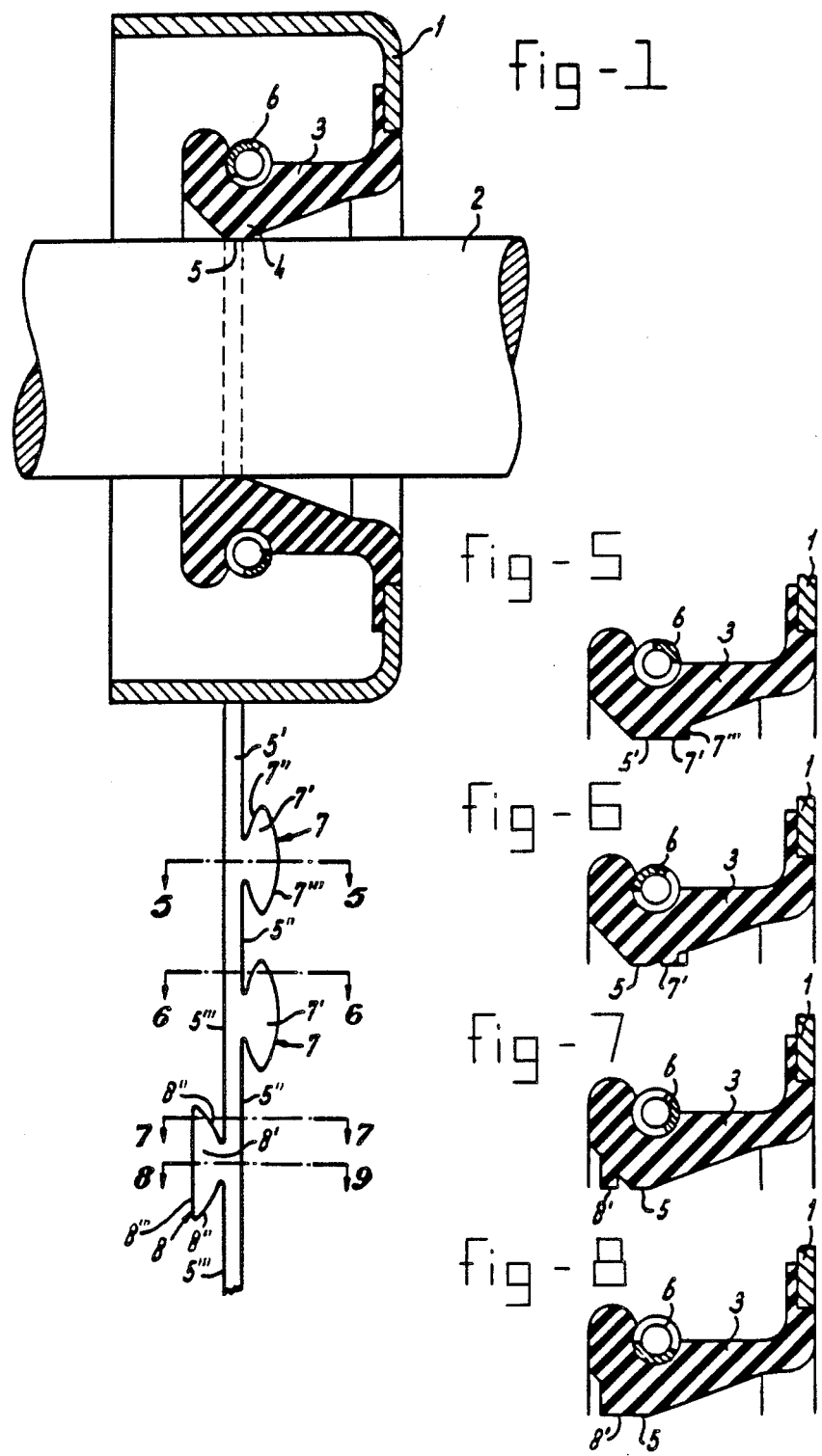

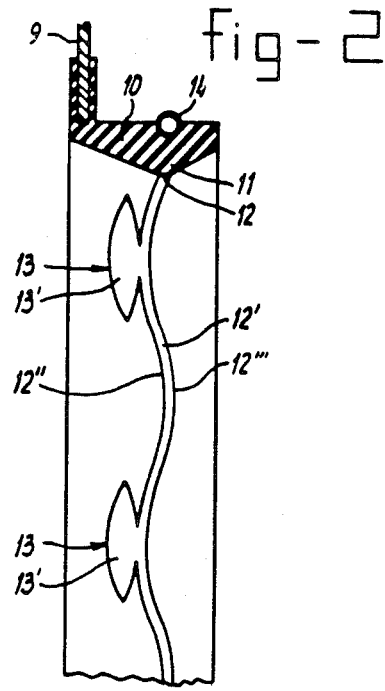
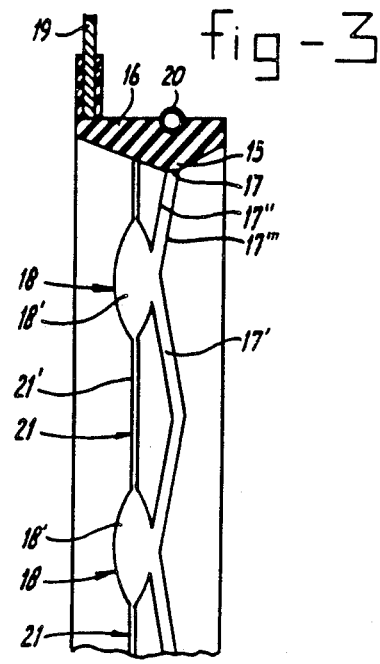
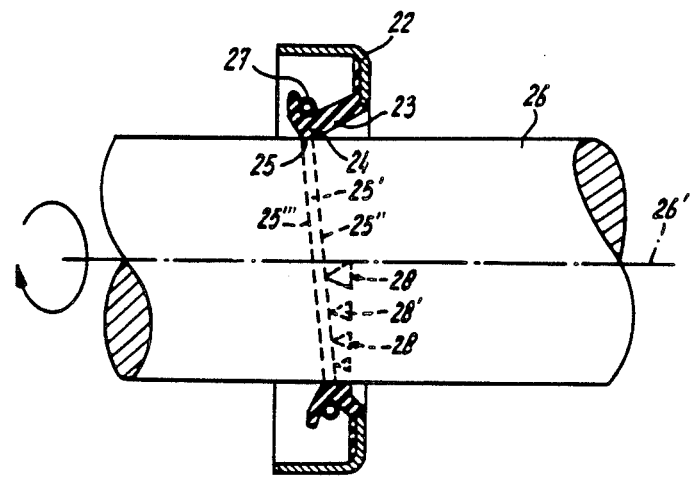

SEALING RING WITH TWO ROWS OF PROJECTIONS AND FOR A ROTARY SHAFT

This is a division of application Ser. No. 654,307 filed Sept. 25, 1984 now U.S. Pat. No. 4,671,519.

BACKGROUND OF THE INVENTION

The invention concerns a sealing ring for a rotary shaft which serves to retain and/or return a lubricant, comprising a generally annular supporting member made of a relatively rigid material and a generally annular sealing member made of an elastic material and connected to the supporting member. The sealing member includes a sealing lip projecting radially inward toward the shaft. The end of the sealing lip is terminated by a sealing surface which when the sealing ring is assembled to the shaft, is in contact with the shaft along a contact surface. One side of the sealing surface is directed toward the lubricant and the other side toward the atmosphere. On the atmospheric side of the sealing surface, spaced apart projections are formed on the lip and the bottom surface of each of these projections rests against the shaft surface in the assembled unit. The contacting surfaces of the projections with the shaft are limited by at least one edge which runs from a point lying at a distance from the adjacent limiting edge of the contact surface of the sealing edge obliquely toward said limiting edge with inclusion of an acute angle. Such a sealing ring is disclosed in U.S. Pat. No. 3,868,105.

A sealing ring of this type is called a hydrodynamic sealing ring because, when the shaft rotates, the projections produce a hydrodynamic effect whereby lubricant which has nevertheless inevitably leaked to the outside, between the sealing surface of the sealing lip and the periphery of the shaft, as a result, for example, of wear on the shaft and/or on the sealing lip, or because particles of dirt have been trapped between the sealing surface and the shaft, is again returned to the margin of the lubricant, so that no lubricant is lost.

The sealing lip which is pressed against the shaft, however, is subject to relatively great frictional forces, whence the lip wears relatively rapidly and must be replaced after a comparatively short time. Moreover, temperature elevations likewise occur, causing the sealing ring to age relatively quickly.

SUMMARY OF THE INVENTION

An object of the invention is to improve a sealing ring of the type discussed above in such a way that it provides an optimal hydrodynamic seal with a longer service life in comparison with the known sealing ring.

This object is accomplished in the sealing ring according to the invention by a sealing lip formed such that, in the assembled state, the contact surface of the lip with the shaft, at least at the lubricant side, is at least partially defined by edges running obliquely with reference to the center line of the shaft.

In this way, when the shaft rotates, a pumping effect is exerted on the lubricant owing to the inclined edge(s) of the contact surface. As a result a film of lubricant is formed under the sealing lip, between the contact surface and the shaft. The film of lubricant is sufficiently thick to practically eliminate friction between the contact surface and the shaft. Although it is true that more lubricant leaks between the contact surface and the shaft, it has been found that, owing to the hydrodynamic projections, this fairly great flow of lubricant directed outward can be reversed, so that no lubricant is lost.

In a first embodiment, at the lubricant side of the sealing surface are formed second projections, spaced apart, on the sealing lip, the lower surface of each projection, in the assembled state, rests against the shaft so that the contact surface of the sealing surface at the lubricant side is limited by first edge portions perpendicular to the center line of the shaft and edge portions placed in between and comprising at least one second edge portion which runs outward from a first edge portion obliquely with respect to the center line of the shaft, with inclusion of an acute angle with the first edge portion. The second projections are staggered, with respect to the first projections at the atmospheric side of the sealing lip.

In this connection, the second projections are preferably formed such that their bottom surfaces in contact with the shaft have the shape of a mushroom. Thus, between each of the aforesaid first edge portions are present two second edge portions running in opposing directions obliquely with respect to the center line of the shaft, which second edge portions are connected together at their extremities by a third edge portion.

In a second embodiment (FIG. 3), the sealing lip is formed in such a way that the sealing surface of the lip is limited by two mutually parallel edges running zigzag. Thus, at the lubricant side, the contact surface is defined by edge portions all of which run obliquely with respect to the center line of the shaft. The first projections, at the atmospheric side of the sealing lip, are located at the angular point of the contact surface pointing toward the atmospheric side.

Instead of edges running zigzag, the sealing lip may alternatively be formed such that the sealing surface of the lip is defined by two mutually parallel, essentially sinusoidal edges (FIG. 2). The first projections on the atmospheric side of the lip are located at the maximums of the sinusoidal contact surface pointing toward the atmospheric side.

In the simplest embodiment of the invention the sealing lip is formed such that the contact surface of the lip is defined by two mutually parallel edges which run obliquely with respect to the center line of the shaft (FIG. 4).

To increase the hydrodynamic effect, a second sealing lip may advantageously be provided between the first projections at the atmospheric side of the lip (FIG. 3).

The second through the fourth embodiments are the subject matter of this patent.

It is noted that British Pat. No. 1,220,985 discloses a hydrodynamic sealing ring of the present type where it is stated that, in a rotating shaft, the hydrodynamic effect causes each drop of oil which is leaked to the outside to be pressed back again, whereby the friction between the contact surface of the sealing lip and the shaft is locally reduced and the service life of the sealing ring thereby increased. Thus, here no oil film of a given thickness is formed by means of special shaping of the sealing lip whereby an oil flow is generated outward from the inside.

BRIEF DESCRIPTION OF THE DRAWINGS

The invention is described in greater detail with reference to the embodiments shown in the drawing.

FIG. 1 illustrates, in radial cross section, a first embodiment of a sealing ring in accordance with the invention, wherein below this cross section, the contact surface between the sealing lip and the periphery of the shaft, is laid out in a plane view;

FIG. 2 illustrates, in radial cross section, a portion of a sealing ring in accordance with a second embodiment of the invention, with the contact surface between the sealing lip and the shaft laid out in a plane surface;

FIG. 3 illustrates, in radial cross section, a portion of a sealing ring in accordance with a third embodiment of the invention, with the contact surface between the sealing lip and the shaft being laid out in a plane surface.

FIG. 4 illustrates, in radial cross section, a fourth embodiment of the sealing ring in accordance with the invention; and FIGS. 5 through 8 are sectional views taken along the lines 5—5 through 8—8, respectively, of FIG. 1.

DESCRIPTION OF THE PREFERRED EMBODIMENTS

As shown in FIG. 1, the sealing ring comprises an annular supporting member 1 of a relatively rigid material which may be accommodated (in a manner not shown) in the bearing housing of the shaft 2. An annular sealing member 3, made of an elastic material, is attached to the supporting member 1. The sealing ring has a sealing lip 4, projecting radially inward, which at its extremity is a sealing surface 5. The sealing surface 5 is in contact along a contact surface 5' with the periphery of the shaft 2, extra pressure being obtained by means of a spiral spring band 6. The left-hand edge of the sealing lip 4 in FIG. 1 is directed toward the lubricant and the right-hand edge toward the atmosphere.

Shown at the bottom of FIG. 1, is the contact surface 5' laid out in a plane surface. At the atmospheric side of the sealing lip 4 are formed projections 7, which are spaced apart. The lower surfaces of the projections 7 rest against the shaft 2 along the contact surfaces 7'. These contact surfaces 7' are defined by edges 7" which run obliquely toward the adjacent limiting edge 5" of the contact surface 5' with inclusion of an acute angle. These obliquely running edges 7" are connected together by the outer connecting edges 7''' running generally in one direction.

At the lubricant side are formed the projections 8. The bottom surfaces of the projections 8 are in contact with the shaft 2 along the contact surface 8'. The contact surface 8' is defined by two limiting edges 8", running in opposing directions obliquely to the limiting edge 5''' of the contact surface 5', and an inner edge 8''' connects these edges 8" together, so that the contact surface 8' has the shape of a mushroom.

In operation, when the shaft 2 rotates, the projections 8 exert a pumping effect on the lubricant. Depending upon the direction of rotation of the shaft 2, the lubricant is pressed between an inclined edge 8" and the abutting edge 5''', whereby a film of lubricant is formed between the contact surface 5' of the lip 4 and the periphery of the shaft 2. The lubricant flow thus generated, directed outward from the inside is reversed by the projections 7, whereby a lubricant flow directed inward from the outside is formed and no lubricant is lost.

In a second embodiment illustrated in FIG. 2, an annular sealing member 10, connected with the supporting member 9, has a sealing lip 11 shaped such that the sealing surface 12 forms a contact surface 12' with the shaft, not shown. The contact surface 12' is defined by two mutually parallel, essentially sinusoidal edges 12" and 12'''. On the atmospheric side of the sealing lip 11, at the left-hand side in FIG. 2, are formed projections 13 located where the sinusoidal edge 12" forms a maximum. Projections 13 are contoured in the same manner as shown in FIG. 1 for the projections 7, the projections 13 being in contact with the contact surfaces 13'.

In this embodiment a pumping effect is exerted by the sinusoidal edge 12''' on the lubricant present, whereby a film of lubricant is formed between the contact surface 12' and the periphery of the shaft. The flow of lubricant produced thereby is again reversed by the projections 13.

In the embodiment represented in FIG. 3, a sealing lip 15 of a sealing member 16 is formed such that a sealing surface 17 forms a contact surface 17' with the shaft (not shown) which contact surface 17' is defined by two mutually parallel edges 17", 17''' running zigzag. Projections 18 are formed on the atmospheric side of the sealing lip 5, placed at the left in FIG. 3, at locations where the limiting edge 17", running zigzag, has angular points pointing toward the atmospheric side. The projections 18 are formed with the same contours as the projections 7 in FIG. 1, so that the bottom surfaces of the projections 18 are in contact with the shaft along the contact surfaces 18. In addition, a supporting member 19 and a spring band 20 are likewise shown.

Additionally shown in FIG. 3 is a second sealing lip 21 which is provided between the projections 18 and which is in contact with the shaft along the contact surface 21'. The flow of lubricant generated outward from the inside as a result of the pumping effect of the inclined limiting edges 17''', is more reliably reversed by this second sealing lip than by the projections 18 alone.

Such a second sealing lip may alternatively be provided in the embodiments of FIGS. 1 and 2.

In FIG. 4, a sealing ring includes an annular supporting member 22 made of a relatively rigid material and a generally annular sealing member 23, made of an elastic material and connected with the supporting member 22. The sealing member 23 includes a sealing lip 24, projecting radially inward, and having at its extremity a sealing surface 25, which is in contact with the shaft 26, along a contact surface 25'. Extra pressure is obtained by the spiral band 27. Here, the sealing lip 24 is formed such that the contact surface 25' is defined by two limiting edges 25", 25''' running parallel to one another and extending obliquely with respect to the center line 26' of the shaft 26. Projections 28 are formed, in the same contours as represented in FIG. 1, on the atmospheric side of the sealing lip 24, shown at the right-hand side in FIG. 4. The bottom surfaces of the projections 28 are in contact with the shaft 26 along the contact surfaces 28'.

In this embodiment, the limiting edge 25''', running obliquely with respect to the center line 26', exerts a pumping effect on the lubricant present, whereby a film of lubricant is formed between the contact surface 25' and the periphery of the shaft 26, as well as a lubricant flow directed outward from the inside. This outward flow, however, is reversed by the projections 28.

A second sealing lip, as indicated in FIG. 3 at 21, may alternatively be provided here between the projections 28.

We claim:

1. In a seal for a rotary shaft, for exerting a pumping effect on a lubricant on said shaft, wherein the seal comprises a substantially rigid annular supporting member and a generally annular elastic sealing member affixed coaxially to the supporting member and extending radially inwardly of the supporting member, the radially inner surface of said sealing member defining a sealing contact surface adapted to sealingly contact said shaft; the improvement wherein said sealing contact surface has a first circumferentially extending portion and a plurality of projecting portions extending axially from one side of said first portion and being circumferentially spaced apart, said first portion having a substantially constant axial width throughout its circumference and extending at an acute angle with respect to the axis of the rotary shaft, said projections having circumferentially extending edges spaced from said one side of said first portion and joined to second and third edges which extend to said one side of said first portion at acute angles thereto.

2. The seal of claim 1 wherein said first portion has a sinusoidal shape.

3. The seal of claim 2 wherein said projections extend from the apexes on said one side of the sinusoidal curve formed by said first portion.

4. The seal of claim 2 wherein said circumferentially extending edges of said projections are arcuate.

5. The seal of claim 1 wherein said first portion has a zig-zag shape.

6. The seal of claim 5 wherein said projections extend from the apexes on said one side of the zig-zag curve formed by said first portion.

7. The seal of claim 5 wherein said circumferentially extending edges are arcuate.

8. The seal of claim 5 further comprising circumferentially extending portions in a plane perpendicular to said axis and joining said projections at the ends of said circumferentially extending edges.

9. The seal of claim 1 wherein said first portion extends in a plane oblique to the axis of said seal.

10. The seal of claim 9 wherein said projections are substantially triangular.

11. In a seal for a rotary shaft, for exerting a pumping effect on a lubricant on said shaft, wherein the seal comprises a substantially rigid annular supporting member and a generally annular elastic sealing member affixed coaxially to the supporting member and extending radially inwardly of the supporting member, the radially inner surface of said sealing member defining a sealing contact surface adapted to sealingly contact said shaft; the improvement wherein said sealing contact surface has a first circumferentially extending portion and a plurality of projecting portions extending axially from one side of said first portion and being circumferentially spaced apart, said first portion having a substantially constant axial width throughout its circumference and having a substantially continually varying axial displacement with respect to the axis of the seal, said projections having circumferentially extending edges spaced from said one side of said first portion and joined to second and third edges which extend to said one side of said first portion at acute angles thereto.

12. The seal of claim 11 wherein said first portion is sinusoidal.

13. The seal of claim 11 wherein said first portion is zig-zag shaped.

* * * * *